(12) United States Patent
Wheeler et al.

(10) Patent No.: US 6,343,901 B2
(45) Date of Patent: Feb. 5, 2002

(54) REMOVABLE TOOL HOLDER

(75) Inventors: Dale K. Wheeler, Fallston; Thomas J. Wheeler, Baltimore, both of MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/792,975

(22) Filed: Feb. 26, 2001

Related U.S. Application Data

(60) Continuation of application No. 09/653,797, filed on Sep. 1, 2000, now Pat. No. 6,224,303, which is a division of application No. 09/120,915, filed on Jul. 22, 1998, now Pat. No. 6,126,370.

(51) Int. Cl.$^7$ ............................................. B23B 31/22
(52) U.S. Cl. .................. 408/239 R; 279/30; 279/46.6; 279/75; 279/905; 409/234
(58) Field of Search ........................... 279/22, 30, 74, 279/75, 904, 905, 103, 145, 46.2, 54, 71, 43.6, 46.6; 408/239 R, 240; 409/232, 234

(56) References Cited

U.S. PATENT DOCUMENTS

| 1,124,981 A | 1/1915 | Weaver |
| 1,955,642 A | 4/1934 | Laughlin |
| 2,069,527 A | 2/1937 | Kirkland |
| 2,290,215 A | 7/1942 | Stenberg |
| 2,662,773 A | 12/1953 | Parsons |

(List continued on next page.)

FOREIGN PATENT DOCUMENTS

| GB | 8248 | of 1910 |
| GB | 636021 | 4/1950 |
| GB | 664443 | 1/1952 |
| JP | 6-134608 | 5/1994 |
| SU | 1144793 A | 3/1985 |
| WO | WO 95/32830 | 12/1995 |
| WO | WO 96/19677 | 6/1996 |
| WO | WO 97/25542 | 7/1997 |
| WO | WO 97/27020 | 7/1997 |
| WO | WO 97/31740 | 9/1997 |
| WO | WO 97/48513 | 12/1997 |
| WO | WO 97/49514 | 12/1997 |
| WO | WO 97/49515 | 12/1997 |
| WO | WO 98/17428 | 4/1998 |
| WO | WO 98/25034 | 6/1998 |
| WO | WO 98/29212 | 7/1998 |
| WO | WO 98/30365 | 7/1998 |

*Primary Examiner*—Steven C. Bishop
(74) *Attorney, Agent, or Firm*—Harness, Dickey & Pierce, P.L.C.

(57) ABSTRACT

A rotary device has a releasable tool holder. A spindle with two ends has one end adapted to secure to a rotary device and the other includes a bore to receive a tool. A mechanism to retain and release the tool from the spindle bore is coupled with the spindle adjacent the bore end. At least two unlike retention members to apply a force on the tool in the bore are adjacent the bore. A sleeve surrounds the bore end of the spindle as well as the at least two unlike retention members. The sleeve has a common surface to apply a force on the at least two unlike retention members such that when the sleeve is axially moved along the spindle, the force is varied with respect to the position of the surface on the retention member. This force maintains the tool in the bore or enables the tool to be removed from the bore. A biasing member maintains the sleeve in a retention position on the spindle.

7 Claims, 8 Drawing Sheets

U.S. PATENT DOCUMENTS

| | | |
|---|---|---|
| 2,926,020 A | 2/1960 | Dayton et al. |
| 3,019,027 A | 1/1962 | Klein et al. |
| 3,436,086 A | 4/1969 | Glenzer |
| 3,529,842 A | 9/1970 | Benjamin et al. |
| 3,674,281 A | 7/1972 | Hedrick |
| 3,720,417 A | 3/1973 | Smith |
| 3,756,737 A | 9/1973 | Smith |
| 3,767,218 A | 10/1973 | Linthicum et al. |
| 3,851,890 A | 12/1974 | Smith |
| 3,893,677 A | 7/1975 | Smith |
| 3,975,032 A | 8/1976 | Bent et al. |
| 4,171,821 A | 10/1979 | Miller |
| 4,184,692 A | 1/1980 | Benson et al. |
| 4,188,041 A | 2/1980 | Soderberg |
| 4,211,425 A | 7/1980 | Halvorsen |
| 4,273,344 A | 6/1981 | Benson et al. |
| 4,290,617 A | 9/1981 | Yoshida |
| 4,395,051 A | 7/1983 | Tonomura |
| 4,626,152 A | 12/1986 | Palm |
| 4,690,641 A | 9/1987 | Luiset et al. |
| 4,692,073 A | 9/1987 | Martindell |
| 4,710,079 A | 12/1987 | Smith et al. |
| 4,795,291 A | 1/1989 | March |
| 4,828,277 A | 5/1989 | De Bastiani et al. |
| 4,858,939 A | 8/1989 | Riggs |
| 4,946,179 A | 8/1990 | De Bastiani et al. |
| 4,989,887 A | 2/1991 | Jordan |
| 5,188,378 A | 2/1993 | Erlenkeuser |
| 5,193,825 A | 3/1993 | Kanaan et al. |
| 5,314,198 A | 5/1994 | Kanaan |
| 5,354,075 A | 10/1994 | Marik et al. |
| 5,411,275 A | 5/1995 | Huff et al. |
| 5,464,229 A | 11/1995 | Salpaka |
| 5,511,801 A | 4/1996 | Kanaan et al. |
| 5,531,461 A | 7/1996 | Huff et al. |
| 5,573,255 A | 11/1996 | Salpaka |
| 5,577,743 A | 11/1996 | Kanaan et al. |
| 5,586,847 A | 12/1996 | Mattern, Jr. et al. |
| 5,678,961 A | 10/1997 | Fleege et al. |
| 5,704,616 A | 1/1998 | Huff et al. |
| 5,755,448 A | 5/1998 | Kanaan et al. |
| 5,775,704 A | 7/1998 | Wilson et al. |
| 5,775,981 A | 7/1998 | Yang |
| 5,788,248 A | 8/1998 | Gibson |
| 5,810,366 A | 9/1998 | Montjoy et al. |
| 5,816,583 A | 10/1998 | Middleton |
| 5,820,135 A | 10/1998 | Han et al. |
| 5,820,136 A | 10/1998 | Han et al. |
| 5,988,957 A | 11/1999 | Wheeler |
| 6,126,370 A * | 10/2000 | Wheeler et al. ........ 408/239 R |
| 6,224,303 B1 * | 5/2001 | Wheeler et al. ........ 408/239 R |

* cited by examiner

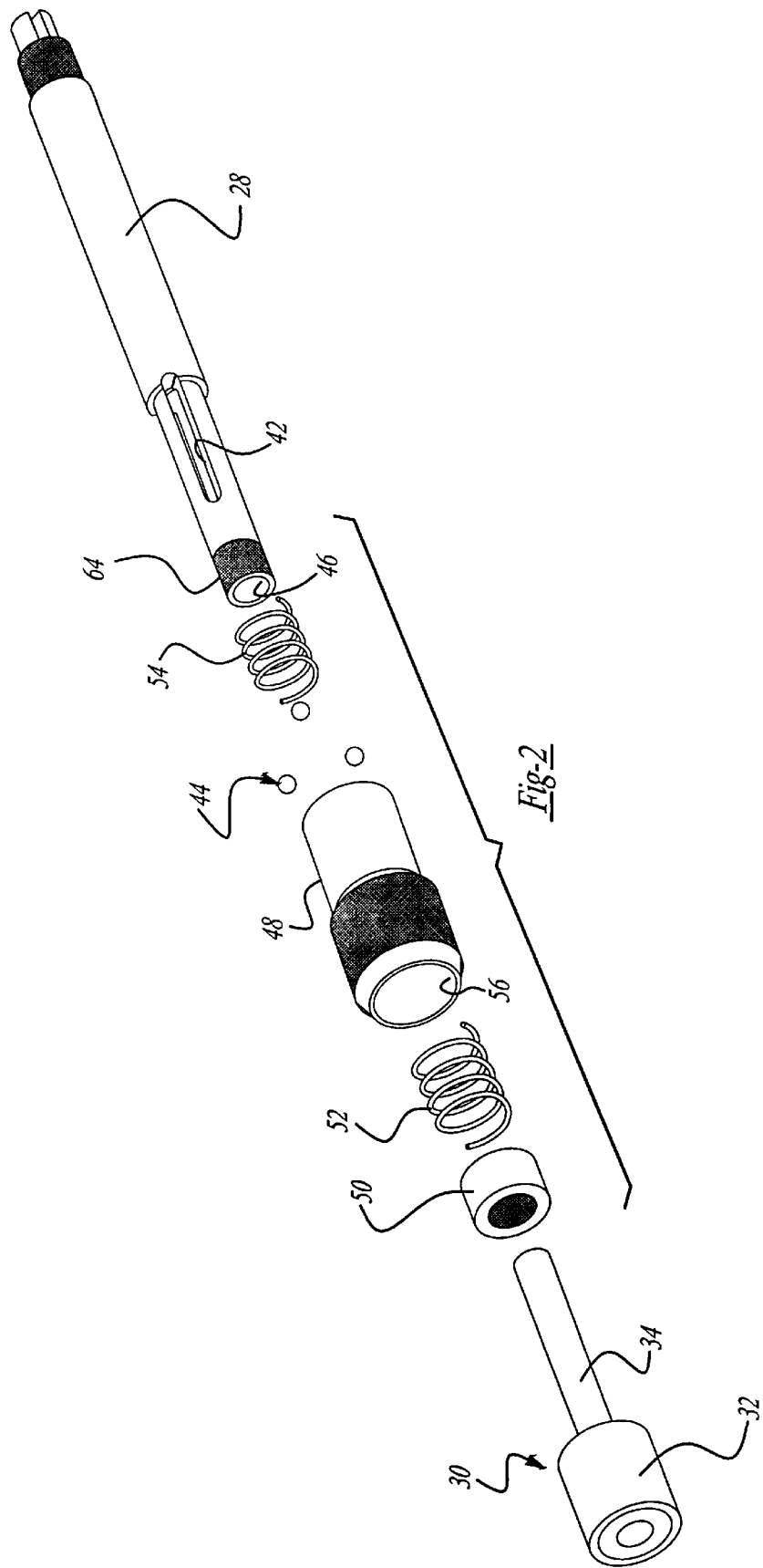

REMOVABLE TOOL HOLDER

CROSS-REFERENCE TO RELATED APPLICATIONS

This application is a continuation of application Ser. No. 09/653,797 filed on Sep. 1, 2000, now U.S. Pat. No. 6,224,303 which is a divisional of application Ser. No. 09/120,915 filed on Jul. 22, 1998, now U.S. Pat. No. 6,126,370, the specifications and drawings of which are herein expressly incorporated by reference.

BACKGROUND OF THE INVENTION

The present invention relates power tools and, more particularly, to rotary tools. The invention is particularly directed to a tool releasing mechanism for rotary power tools such as rotary tools, routers, and die grinders.

Rotary devices are used for numerous tasks by carpenters, artists and do-it-yourselfers. Rotary devices are ideal for cutting, cleaning, engraving, sanding, sharpening and other applications. Rotary devices are utilized in hobbies, woodwork and numerous tasks, both commercially and residential. Ordinarily, rotary devices include a collet device to retain a tool within the device. The tools usually include cylindrical shafts with a desired diameter. The collets ordinarily frictionally grab the shafts to retain the tools within the rotary device. Ordinarily, the collet has a threaded sleeve which exerts a radial force onto the shaft as it is rotated to tighten down the tool within the device.

In order for the user to change tools in the rotary device, he must rotate the collet sleeve with a wrench while locking the spindle against rotation to loosen it and then remove the tool from the collet. To change to an additional tool, the user must place the tool in the collet and rotate the sleeve with a wrench while locking the spindle against rotation which, in turn, tightens the collet device. This process is time consuming and requires a significant amount of user interaction. Thus, it would be desirable to have a collet which quickly enables removal and retention of the tool. Also, the releasable collet should be easily manipulated by the user requiring a minimum amount of user interaction.

SUMMARY OF THE INVENTION

The present invention provides the art with a quick release tool holder which is easily manipulated by the user. The present invention provides a rotatable device which enables quick removal and retention of tools having cylindrical shanks. The present invention provides retention members which solely retain the tools within the rotary device.

In accordance with a first aspect of the invention, a releasable tool holder comprises a spindle having two ends. One of the ends is adapted to secure the spindle to the rotary device. The other end includes a bore to receive a tool. A mechanism to retain and release the tool from the spindle is coupled with the spindle adjacent the bore end. The mechanism comprises at least two unlike retention members to apply a force on the tool in the bore to retain the tool within the bore. A sleeve surrounds a portion of the spindle and the at least two retention members. The sleeve includes a common surface in contact with the at least two retention members to apply a force on the two retention members. The surface contacts the retention member and rolls to a force equilibrium. Thus, the retention member exerts tremendous force on the tool against the surface which maintains the tool in the bore. As the surface moves with respect to the retention member, the force lessens, which enables the tool to be removed from the bore. A biasing member maintains the sleeve in a retention position on the spindle. Preferably, the sleeve common surface is tapered along the spindle axis. A second biasing member may be associated with at least one retention member to register the retention member on the spindle. One of the retention members is a ball while the other is a non-circular elliptical tapered roller. Also, the ball may be a pair of balls.

In accordance with a second aspect of the invention, a rotary device comprises a housing with a motor to provide rotary movement. A power source, either an AC or a DC source, is coupled with the motor. A spindle is coupled with the motor. An activation member is included to energize the motor. A releasable tool is coupled with the spindle. One of the spindle ends is adapted to secure the spindle to the rotary device. The other end includes a bore to receive a tool. A mechanism to retain and release the tool from the spindle is coupled with the spindle adjacent the bore end. The mechanism comprises at least two unlike retention members to apply a force on the tool in the bore to retain the tool within the bore. A sleeve surrounds a portion of the spindle and the at least two retention members. The sleeve includes a common surface in contact with the at least two retention members to apply a force on the two retention members. The surface contacts the retention member and rolls to a force equilibrium. Thus, the retention member exerts tremendous force on the tool against the surface which maintains the tool in the bore. As the surface moves with respect to the retention member, the force lessens, which enables the tool to be removed from the bore. A biasing member maintains the sleeve in a retention position on the spindle. Preferably, the sleeve common surface is tapered along the spindle axis. A second biasing member may be associated with at least one retention member to register the retention member on the spindle. One of the retention members is a ball while the other is a non-circular elliptical tapered roller. Also, the ball may be a pair of balls.

In accordance with a third aspect of the invention, a releasable tool comprises a spindle having two ends. One end is adapted to secure the spindle with a rotary device. The other end includes a bore to receive a tool. A mechanism to retain and release the tool from the spindle is coupled with the spindle adjacent the bore end. The mechanism includes three retention members, a ball and two non-circular elliptical tapered rollers, to apply force on the tool in the bore to retain the tool in the bore. A sleeve surrounds a portion of the spindle and the three retention members. The sleeve includes a common surface tapered along the spindle axis in contact with each of the three retention members. The tapered surface contacts each of the three retention members and rolls to a force equilibrium. The retention members exert a tremendous force on the tool against the tapered surface which maintains the tool in the bore. As the tapered surface moves with respect to the three retention members, the force lessens, which enables the tool to be removed from the bore. A pair of springs are also included. One spring maintains the sleeve in a retention position on the spindle. The other spring, which may include a squared end, registers the ball on the spindle.

In accordance with a fourth aspect of the invention, a releasable tool holder comprises a spindle having two ends. One of the ends is adapted to secure the spindle to the rotary device. The other end includes a bore to receive a tool. A mechanism to retain and release the tool from the spindle is coupled with the spindle adjacent the bore end. The mechanism comprises at least one retention member to apply a force on the tool in the bore to retain the tool within the bore.

A sleeve surrounds a portion of the spindle and the at least one retention member. The sleeve includes a surface in contact with the at least one retention member to apply a force on the retention member. The surface contacts the retention member and rolls to a force equilibrium. Thus, the retention member exerts tremendous force on the tool against the surface which maintains the tool in the bore. As the surface moves with respect to the retention member, the force lessens, which enables the tool to be removed from the bore. A biasing member maintains the sleeve in a retention position on the spindle. Preferably, the sleeve surface is tapered along the spindle axis. The sleeve surface may be arcuate with respect to the circumferential direction with a radius larger than the radius of the retention member. The retention members rotate to slightly back drive the sleeve until the arcuate surface frictionally pinches the retention members between the sleeve and tool to stop rotation of the retention members to provide a self-locking feature which prevents the retention members from further back driving the sleeve. A second biasing member may be associated with the at least one retention member to register the retention member on the spindle and to each other. The bottom of the spindle bore may be angled with respect to the spindle axis to center the tool in the bore. An O-ring seal may be positioned in the bore to prohibit contamination from entering the bore. Also, an additional sleeve may be positioned inside the bore to enable retention of smaller diameter tools as well as to reduce marking or abrading of the shank.

In accordance with a fifth aspect of the invention, a rotary device comprises a housing with a motor to provide rotary movement. A power source, either an AC or a DC source, is coupled with the motor. A spindle is coupled with the motor. An activation member is included to energize the motor. A releasable tool is coupled with the spindle. One of the spindle ends is adapted to secure the spindle to the rotary device. The other end includes a bore to receive a tool. A mechanism to retain and release the tool from the spindle is coupled with the spindle adjacent the bore end. The mechanism comprises at least one retention member to apply a force on the tool in the bore to retain the tool within the bore. A sleeve surrounds a portion of the spindle and the at least one retention member. The sleeve includes a surface in contact with the at least one retention member to apply a force on the retention member. The surface contacts the retention member and rolls to a force equilibrium. Thus, the retention member exerts tremendous force on the tool against the surface which maintains the tool in the bore. As the surface moves with respect to the retention member, the force lessens, which enables the tool to be removed from the bore. A biasing member maintains the sleeve in a retention position on the spindle. Preferably, the sleeve surface is tapered along the spindle axis. The sleeve surface may be arcuate with respect to the circumferential direction with a radius larger than the radius of the retention member. The retention members rotate to slightly back drive the sleeve until the arcuate surface frictionally pinches the retention members between the sleeve and tool to stop rotation of the retention members to provide a self-locking feature which prevents the retention members from further back driving the sleeve. A second biasing member may be associated with the at least one retention member to register the retention member on the spindle and to each other. The bottom of the spindle bore may be angled with respect to the spindle axis to center the tool in the bore. An O-ring seal may be positioned in the bore to contact the shaft to prohibit contamination from entering the bore. Also, an additional sleeve may be positioned inside the bore to enable retention of smaller diameter tools as well as to reduce marking or abrading of the shank.

In accordance with a sixth aspect of the invention, a releasable tool comprises a spindle having two ends. One end is adapted to secure the spindle with a rotary device. The other end includes a bore to receive a tool. A mechanism to retain and release the tool from the spindle is coupled with the spindle adjacent the bore end. The mechanism includes three balls to apply force on the tool in the bore to retain the tool in the bore. A sleeve surrounds a portion of the spindle and the three balls. The sleeve includes a surface tapered along the spindle axis in contact with each of the three balls. The tapered surfaces contact each of the three balls and rolls to a force equilibrium. The balls exert a tremendous force on the tool against the tapered surface which maintains the tool in the bore. As the tapered surface moves with respect to the retention member, the force lessens, which enables the tool to be removed from the bore. A pair of springs are also included. One spring maintains the sleeve in a retention position on the spindle. The other spring, which includes a squared end, registers the balls on the spindle. The tapered surfaces may be arcuate in a circumferential direction and have a radius larger than the balls. The retention members rotate to slightly back drive the sleeve until the arcuate surface frictionally pinches the retention members between the sleeve and tool to stop rotation of the retention members to provide a self-locking feature which prevents the retention members from further back driving the sleeve. Also, the bottom of the spindle bore may be angled with respect to the axis of the bore to center the tool in the bore. A sleeve may be positioned in the bore to retain smaller diameter shafts in the bore. Also, the sleeve may be used to protect the shafts from marking, abrading or the like. The sleeve may be a split sleeve with recesses on its outer periphery. Further, an O-ring may be positioned in the bore to contact the tool shaft to prohibit contamination from entering the bore.

Other objects, features and advantages of the present invention will become more fully apparent from the following detailed description of the preferred embodiment and the accompanying drawings.

BRIEF DESCRIPTION OF THE DRAWINGS

The accompanying drawings, which are incorporated in and constitute a part of the specification, illustrate an embodiment of the invention and together with the description serve to explain the principles of the invention.

FIG. 2 is an exploded view of a quick release tool in accordance with the present invention.

DETAILED DESCRIPTION OF THE PREFERRED EMBODIMENT

Figure 1:
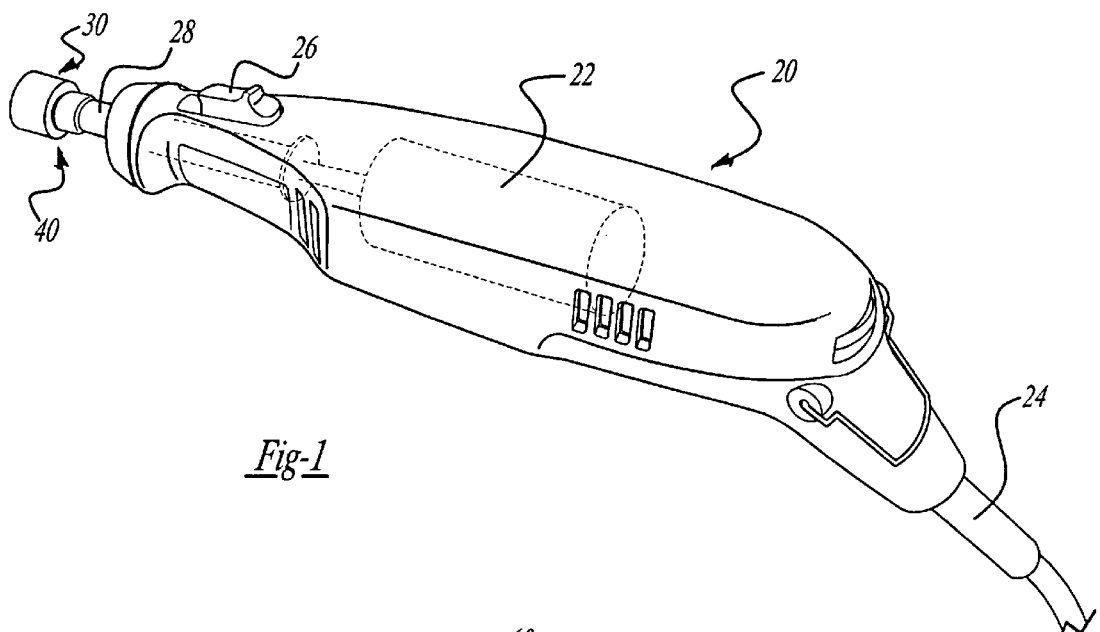
FIG. 1 is a perspective view of a rotary device in accordance with the present invention.

Turning to the figures, a rotary device is illustrated and designated with the reference numeral 20. The rotary device includes a motor 22 to provide rotary movement, and a power source 24. The power source 24 is shown as a power cord providing AC current; however, the device could be battery operated and provided with a battery. An activation member 26 is electrically coupled with the motor 22 to turn the motor on and off to rotate the spindle 28 which is coupled with the motor 22. A tool 30 is coupled with the spindle 28 via a releasable mechanism 40. The tool 30 may have some type of head 32 and a shaft 34 secured with the head 32. The shaft 34 is ordinarily cylindrical and of a desired diameter.

Figure 3:
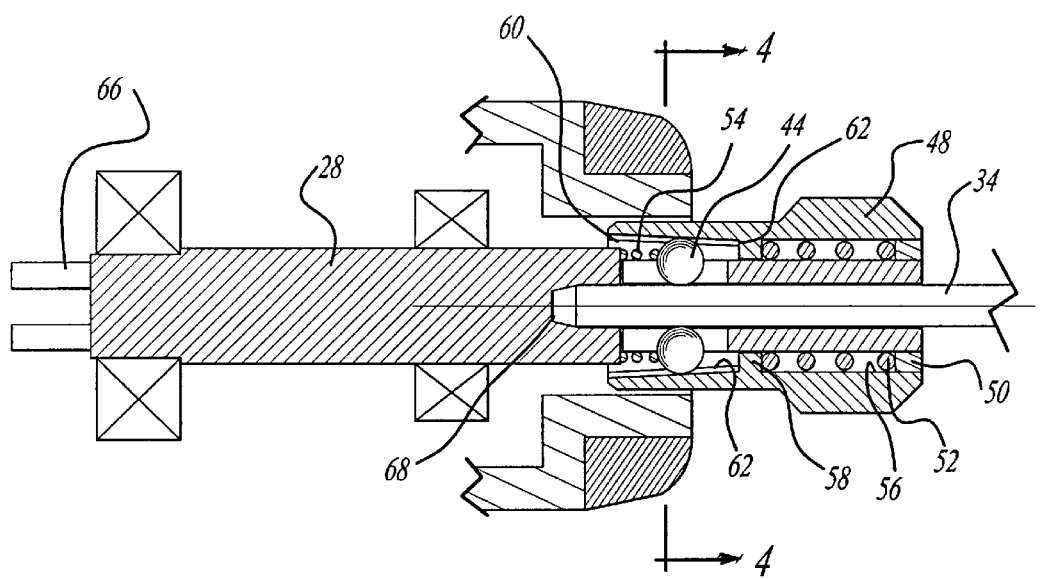
FIG. 3 is a longitudinal cross-section view of the tool of FIG. 2.

Turning to FIGS. 2 and 3, a better understanding of the quick release mechanism will be had. The spindle 28 ordinarily includes apertures 42 to receive retention members 44. In the present case, three balls retain the tool 30 within the bore 46 of the spindle 28. A sleeve 48 surrounds the bore end of the spindle 28. The sleeve 48 also surrounds the balls 44 as will be described herein. A retention member 50 retains the sleeve 48 on the spindle 28. Further, a spring 52, which provides a biasing force, maintains the sleeve 48 in a retained position as seen in FIG. 3. Also, a spring 54, with a squared or ground end 55, is included which registers the balls 44 within the apertures 42.

The sleeve 48 includes a bore 56. The bore 56 has a diameter which enables the bore to slide over the retention member 50 and retain the spring 52 within the bore 56 as seen in FIG. 3. A shoulder 58 separates the bore from a second bore 60. The second bore 60 includes surfaces 62, which are tapered along the longitudinal axis of the spindle 28. The tapered surfaces 62 are in contact with the balls 44. The tapered surfaces 62 apply the force to the balls 44 which, in turn, apply force to the cylindrical tool shank 34.

The spring 54 urges the balls 44 toward the origin of the tapered surfaces 62. This causes the balls to roll against the tapered surfaces 62. Since the balls 44 cannot roll up the tapered surfaces 62 to their origin, the balls exert tremendous retention force on the tool shank 34 to maintain the tool in the bore. Thus, if a withdrawal force is applied on the tool, the balls try to roll up the tapered surfaces 62 which prohibit withdrawal. However, once the sleeve 48 is moved against spring 52, the distal end of the tapered surfaces 62 moves forward enabling removal of the tool.

The tapered surface is angled from the spindle axis at an angle of from about one (1) to about three (3) degrees. This applies a significant amount of force to the balls 44 to retain the shaft 34 within the spindle 28. Also, as can be seen in FIG. 3, the spring 54 applies force to the balls 44 so that the balls 44 are registered on substantially the same plane in the sleeve 48. The registration spring has ground on planar ends which urges the balls 44 to the end of the apertures. This forces the balls 44 to be in the same plane with respect to one another and with respect to the sleeve 48. With the balls in registration, the sleeve does not experience binding forces from the balls. Thus, this eliminates friction forces enabling the balls to roll instead of slide in the apertures.

The retainer 50 inner surface contacts the outer surface 64 of the spindle to friction-fit the two parts together. Also, the spindle 28 includes a second end 66 which couples with the motor which provides the rotary movement of the spindle 28. The spindle bore 46 has a bottom 68 which includes side walls which are angled with respect to the bore axis. The angled side walls help to center the tool within the bore. The side walls are angled at about ten to twelve (10–12°) degrees with respect to the spindle axis.

Figure 4:
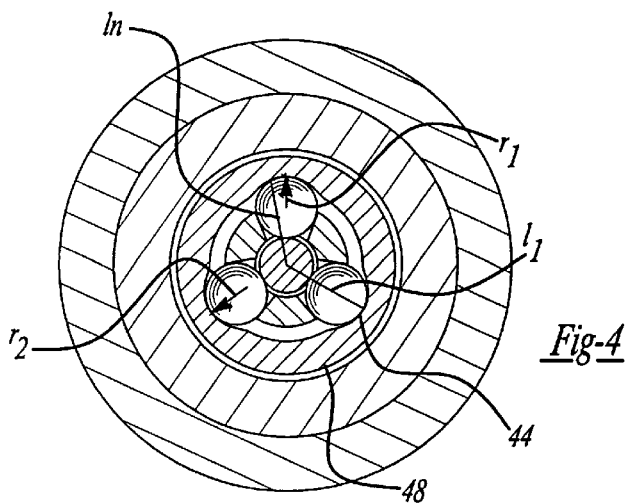
FIG. 4 is a cross-section view of FIG. 3 along line 4—4 thereof.

Turning to FIG. 4, all three balls 44 are illustrated within the sleeve tapered surfaces 62. The tapered surfaces 62 are arcuate with respect to the circumference of the spindle 28. The arc of the surfaces 62 define a radius $r_2$. The balls have a radius $r_1$. The radius $r_2$ of the arc of the surface 62 is at least two times greater than the radius $r_1$ of the balls 44. Accordingly, line 11 between the center of the tool shaft 34, passing through the diameter of the ball 44, and the surface 62 is larger than any line $I_n$ from the center of the tool shaft to the surface 62. Thus, as the tool shaft begins to rotate, the balls 44 begin to rotate, like a gear train, in an opposite direction. The sleeve 44 begins to rotate, or back drive, in the direction of rotation of the balls 44. After a very brief back driving movement, the sleeve 48 becomes locked in position. This is due to the fact that $I_1 > I_n$. As the balls 44 try to roll against the circumferential surface 62 of the sleeve 48, the balls 44 are pinched between the surface 62 and the tool shaft 34, since the balls 44 are no longer on a line defined by $I_1$, but, due to their rolling movement, are on a line defined by $I_n$. Thus, due to the pinching, the balls 44 are prohibited from rolling and exert an extreme force on the tool shaft 34, locking the tool shaft 34 with the sleeve 48. This feature also yields a self-energizing lock permitting a low force locking spring. Thus, the balls 44 auto lock the spindle 34. Accordingly, the sleeve 48 may have a smaller outer diameter. The self-energizing feature also enables a single ball to be used to retain the tool within the spindle bore.

In FIG. 3, the sleeve 48 is moved away from the spindle connecting end 66 which, in turn, moves the distal end of the tapered surfaces towards the front bore end of the spindle. This movement of the sleeve 48 enables the tapered surfaces 62 to exert less force on the balls 44 which enables the shaft to be pulled out of the spindle bore 46. Also, to insert a tool into the release mechanism, the sleeve 48 is pulled forward, away from the spindle attachment end 66, to enable the shaft to be inserted into the bore 46. Accordingly, as the sleeve 46 is moved along the spindle 28 which, in turn, moves the tapered surfaces 62 with respect to the balls 44, the force which is exerted onto the shaft 34 is varied. Thus, depending upon where the tapered surfaces are positioned with respect to the balls 44, the tool shaft 34 is either retained, as illustrated in FIG. 3, in the spindle, or the shaft 34 may be removed from the spindle bore.

Figure 5:
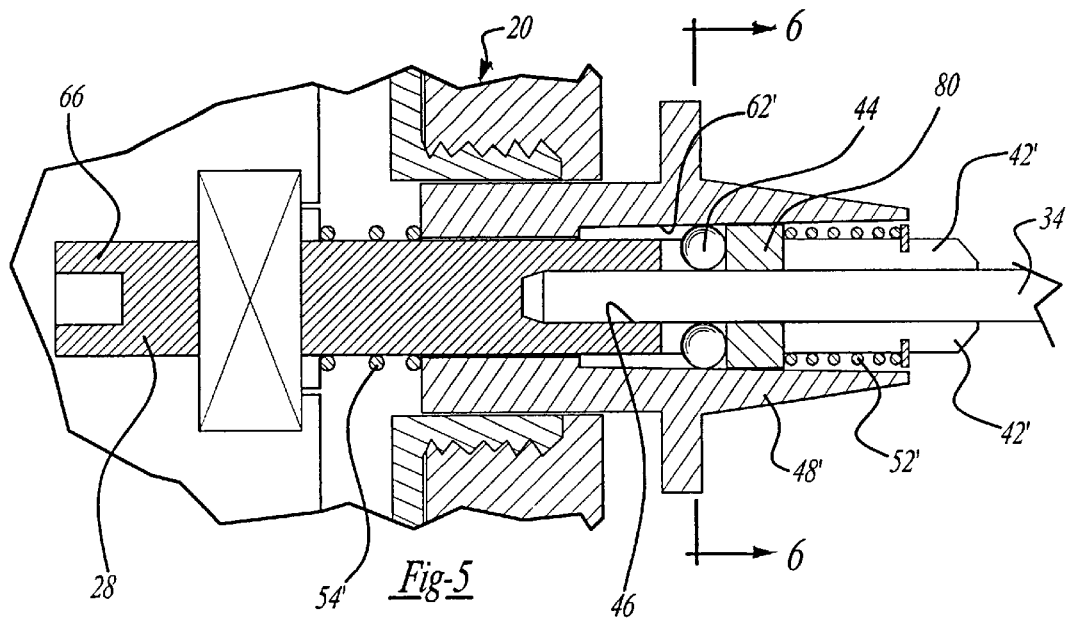
FIG. 5 is a second embodiment of a quick release mechanism in accordance with the present invention.
Figure 6:
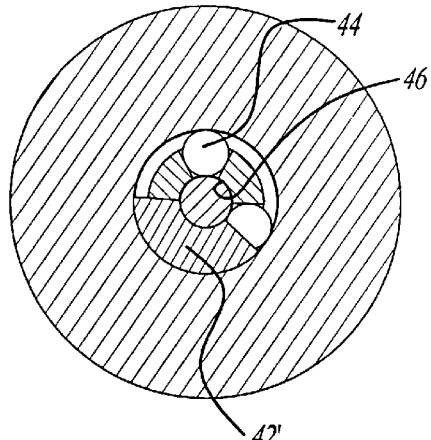
FIG. 6 is a cross-section view of FIG. 5 along line 6—6 thereof.

Turning to FIGS. 5 and 6, an additional embodiment of the invention is shown. Here, the elements which relate to those previously described are marked with the same reference numerals.

The spindle 28 is substantially the same as that shown, however the apertures 42 have been replaced with slots 42' which are open to the end of the spindle 28. The bore 46 is substantially the same as that previously described. The balls 44 are positioned in the slots 42' and are held in registration by a bushing 80. The bushing 80 has fingers 82 which extend into the slots 42 to maintain balls within the slots. Spring 54' exerts a force on the bushing 80 to provide the biasing force to retain the balls 44 in a registered position. The sleeve 48' has tapered bore 62' which extends from one end of the sleeve 48'. The sleeve 48' may rotate with respect to the spindle 28. A spring 52' maintains the sleeve 48 in a retention position. As mentioned above, the tapered bore 62' applies a force on the balls 44 which, in turn, applies a force onto the shank 34. Here, the sleeve 48' is moved toward the spindle securement end 66 to release the shank 34 from the spindle 28. As the sleeve 48' is moved, the distal end of the tapered surface moves closer to the spindle securement end 66 which applies a lesser force onto the balls 44 which enables the tool shank 34 to be removed from the bore 46.

Accordingly, the sleeve 48' is moved in a direction opposite to that of sleeve 48 of FIG. 3.

Figure 7:
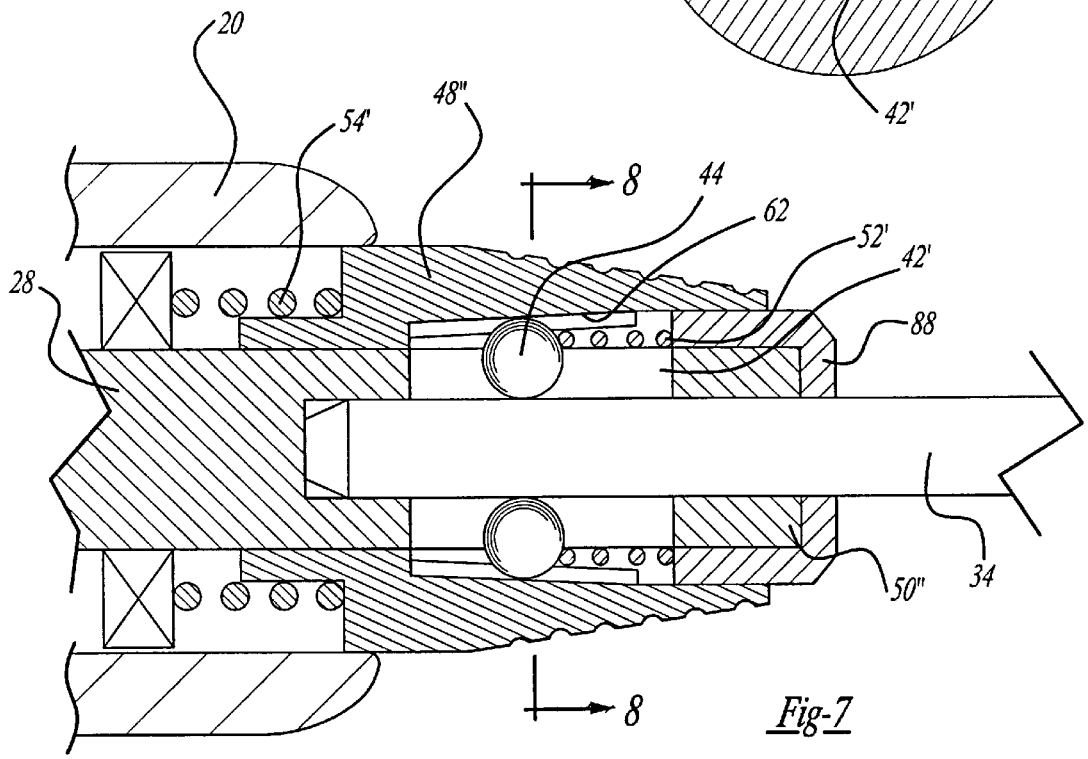
FIG. 7 is a cross-section view of an additional embodiment in accordance with the present invention.
Figure 8:
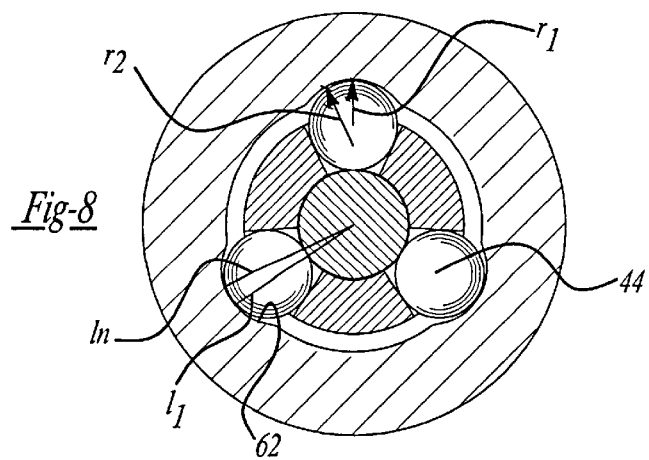
FIG. 8 is a cross-section view of FIG. 7 along line 8—8 thereof.

Moving to FIGS. 7 and 8, an additional embodiment of the present invention is shown. The embodiment in FIG. 7 is like that of FIG. 5.

The differences with respect to FIGS. 5 and 8 is that the sleeve 48" has an outer configuration different than that of FIG. 5. Also, the tapered surfaces 62 are like those of FIG. 3 as best seen in FIG. 8. Thus, the radius $r_2$ of the arcs of the tapered surfaces 62 in the circumferential direction is greater than the radius $r_1$ of the balls 44. The spindle 28 is like that described in FIG. 5. The difference is a retaining member 50" which is frictionally fit in the slots 42'. A cap 88 is positioned over the retainer 50" which serves to steady the sleeve 48" as it is moved inward along the spindle 28. The spring 54 acts directly on the balls 44. Accordingly, the bushing 80 as described above has been removed and a retaining member 50" has been positioned into the slots 42'. The sleeve 48" releases the tool shank 34 like those described above.

Figure 9:
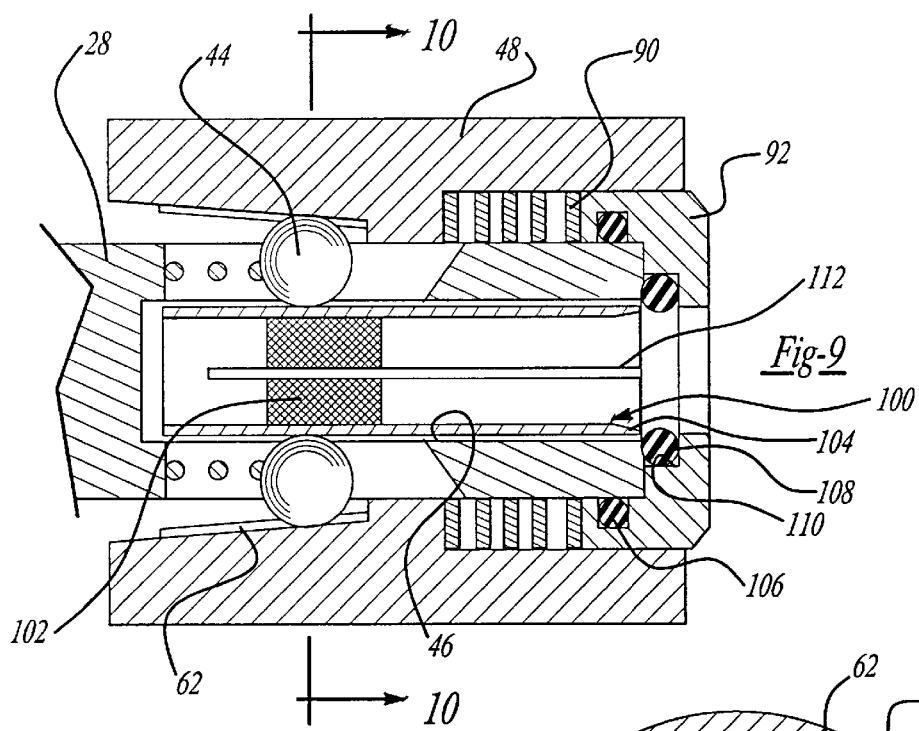
FIG. 9 is a cross-section view of another embodiment of the present invention.
Figure 10:
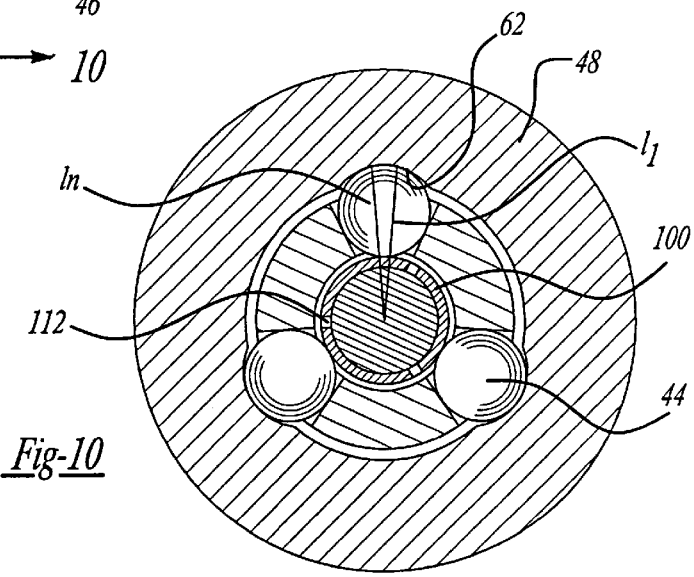
FIG. 10 is a cross-section view of FIG. 9 along line 10—10 thereof.

Turning to FIGS. 9 and 10, an additional embodiment of the present invention is shown. Here, the embodiment is like that of FIG. 3. The spindle 28 is like that described above. The sleeve 48 with tapered surfaces 62 is like that previously described. Here, a wave spring 90 which provides higher spring force has been substituted for spring 52. Also, a cap 92 is positioned on the end of the spindle 28 to retain the spring 90 and, in turn, sleeve 48 on the spindle 28.

A sleeve 100, to adapt to smaller diameter shafts, is positioned within the spindle bore 46. The sleeve 100 includes a knurled or axially splined portion 102 to retain a tool shank 34 within the bore 46. The sleeve 100 also includes a chambered end 104. An O-ring 108 is positioned within a bore step 110 of the cap 92. The O-ring 108 serves to seal the shank 34 within the bore 46. Also, an O-ring 106 may seal the cap 92 with the sleeve 48.

The sleeve 100 also includes an axial slit 112 which enable compression of the sleeve 100 when force is applied to the sleeve by balls 44. Thus, the sleeve 100, as force is applied by the balls 44, applies a circumferential compression force onto the shaft 34 with the knurled surface 102 in contact with and gripping the shaft 34. Also, the sleeve 100 may be of a different material than the shaft. Thus, the balls 44 do not apply a force directly onto the shaft 34. Accordingly, the shaft 34 does not become marked or abraded by the balls acting on the shaft. Thus, the sleeve 100 may have a hardness higher than that of the shaft to enable a strong force to be applied by the balls onto the sleeve 100 and, in turn, onto the shaft 34. The sleeve 48 is moved outward away from the connection end 66 of the spindle as described above with respect to FIG. 3.

Figure 11:
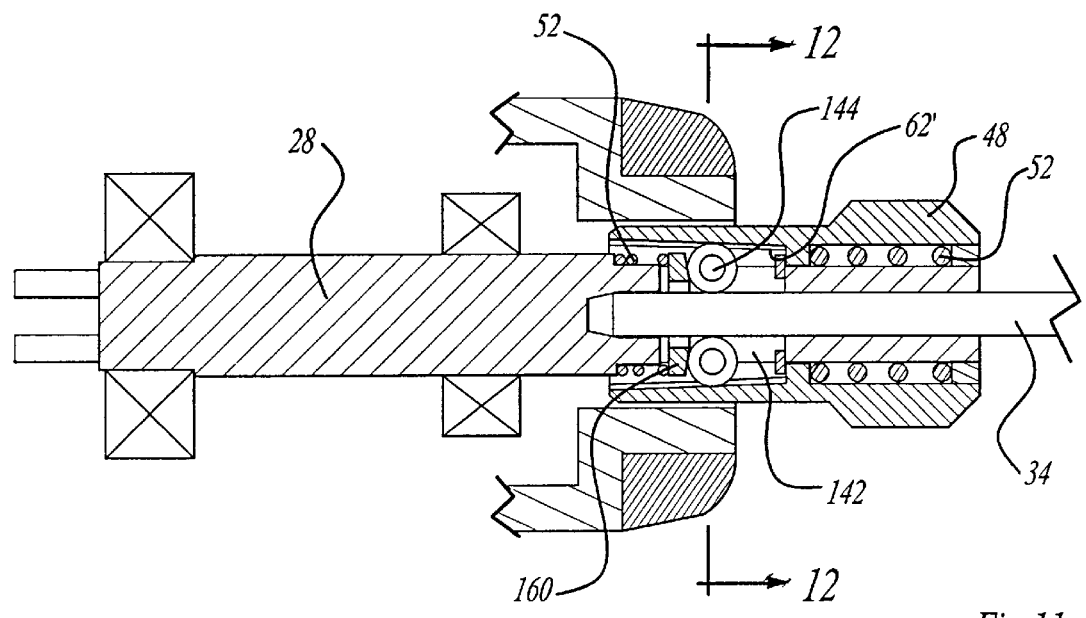
FIG. 11 is a cross-section view like FIG. 3 of another embodiment in accordance with the present invention.
Figure 12:
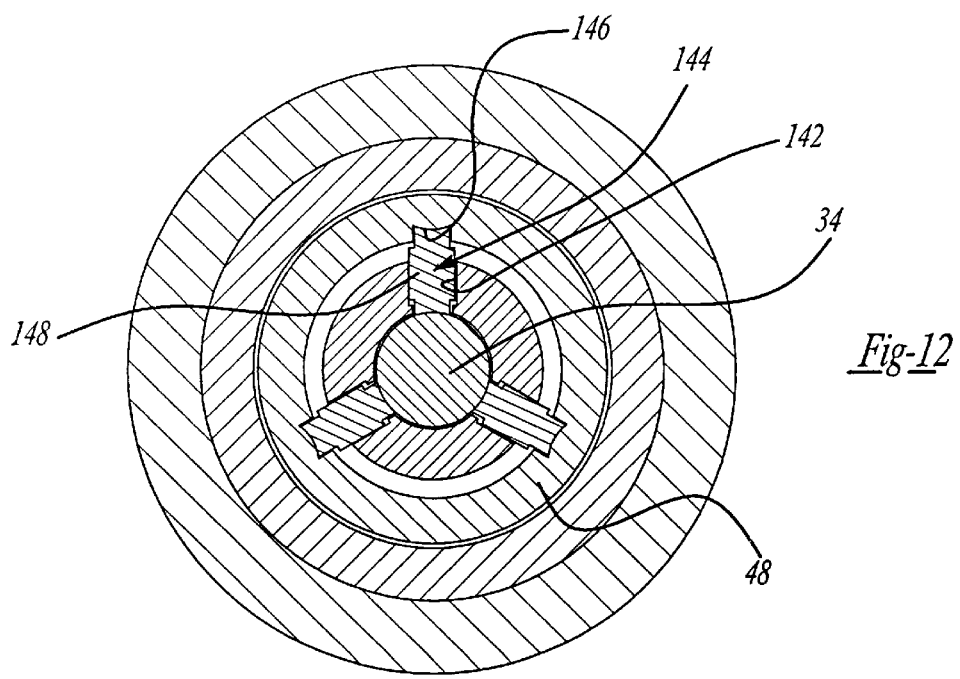
FIG. 12 is a cross-section view of FIG. 11 along line 12—12 thereof.

Turning to FIGS. 11 and 12, an additional embodiment of the present invention is shown. Here, the embodiment is like that of FIG. 3. The spindle 28 is like that described. The sleeve 48 includes tapered surfaces 62'. Tapered surfaces receive discs or rollers 144. The discs 144 have an arcuate running face 146. The arcuate running face 146 is on a radius substantially equal to the radius of the tool shaft 34. Thus, as the shaft 34 is inserted into the discs 144, the arcuate running surface 146 rolls along the shaft 34. Also, the tapered surface 62' is arcuate corresponding to the running face 146. Thus, the discs 144 are enabled to roll against the tapered surface 62'. The discs include a wider body portion 148 which mates within the slot 142 of the spindle 28. Thus, the spindle slots 142 act to position the disc 144 within the spindle 28.

A bushing 160 is positioned in the slots 142 to register the discs 144. The bushing 160 is similar to bushing 82 described above and provides the same function. Also, the spring 52 pushes against the bushing 160 to provide the registration force to keep the disc 144 registered in the same plane within the sleeve 48.

The retention mechanism functions like that described in FIG. 3 above.

Figure 13:
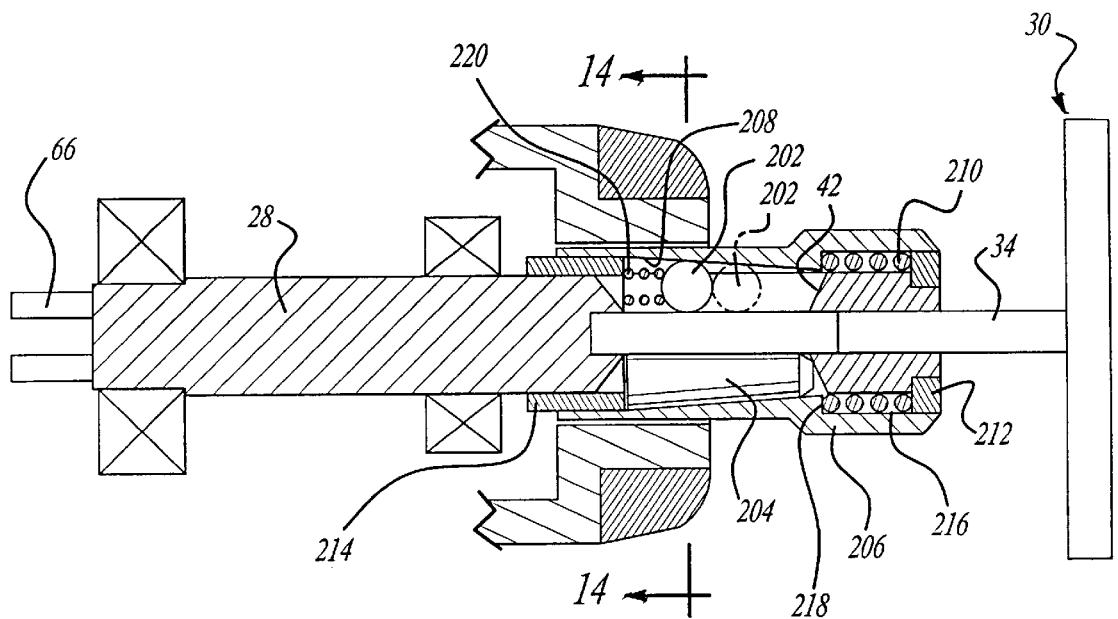
FIG. 13 is a view like FIG. 3 of another embodiment of the present invention.
Figure 14:
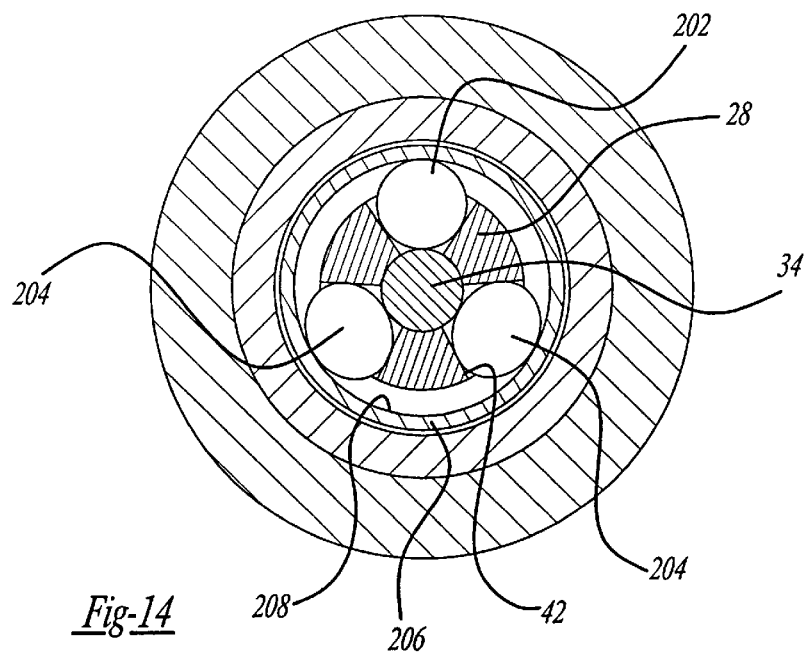
FIG. 14 is a cross-section view of FIG. 13 along line 14—14 thereof.

Turning to FIGS. 13 and 14, an additional embodiment of the present invention is shown. FIG. 13 is a view like FIG. 3 and like parts will be identified with the same reference numerals. The spindle 28 includes apertures 42 to retain retention members 202 and 204 within the spindle. Here, the retention member 202 is a ball in the aperture 42 or a pair of balls may be maintained in the aperture 42. The retention members 204 are elliptical tapered rollers. The elliptical tapered rollers have a non-circular elliptical cross-section as seen in FIG. 14. Likewise, the rollers are tapered and increase in size from one end to the other.

A sleeve 206 surrounds the bore end of the spindle 28. The sleeve 206 includes a common tapered surface 208 which also surrounds the retention members 202 and 204. A spring 210 is positioned within the sleeve which provides a biasing force to maintain the sleeve 206 in a retained position. Also, a retention member 212 retains the sleeve onto the spindle and acts as a dust shield. Further, a sleeve 214 is positioned adjacent the securement end of the spindle to prohibit dust from entering into the apertures 42 inside of the sleeve 206.

The sleeve 206 includes a bore 216. The bore has a diameter which enables the bore to slide over the retention member 212 and retain the spring 210 within the bore 216 as seen in FIG. 13. A shoulder 218 separates the bore from a second bore which is defined by the common tapered surface 208. The common tapered surface 208 is in contact with both the ball and the elliptical tapered rollers. The common tapered surface 208 applies the force onto the ball 202 and elliptical tapered rollers 204 which, in turn, apply force to the cylindrical tool shank 34. A spring 220 urges the ball 202 towards the origin of the tapered surface 208. The spring 220 acts like the spring 54 previously described. Also, a sleeve like that illustrated in FIG. 9 may be used with the present embodiment to prohibit abrading or to accommodate smaller diameter tool shafts in the retention mechanism.

The ball or balls 202 apply a point force onto the tool shaft 34 while the elliptical tapered rollers 204 apply a line contact onto the shaft. Thus, the balls act to prohibit the axial withdrawal of the shaft from the spindle while the elliptical tapered rollers prohibit circumferential rotation of the shaft 34 within the spindle 28. Thus, the retention members 202 and 204 positively retain the tool 30 within the spindle.

To secure an axial pull-out force on the shaft, the balls will roll against the tapered surface 208. Since the ball 202 cannot roll-up the tapered surface 208 to its origin, the ball exerts a tremendous retention force on the tool shank 34 to maintain the tool in the bore. Thus, if a withdrawal force is applied on the tool, the ball or balls try to roll-up the tapered surface 208 which prohibits withdrawal. However, once the sleeve is moved against the spring 210, the distal end of the tapered surface 208 moves forward enabling removal of the tool.

As the shaft tries to rotate against the elliptical tapered rollers 204, since the major axis of the ellipse is larger than the distance between the shaft and the sleeve, the rollers 204 are pinched between the tapered surface 208 and the tool shaft 34. Thus, due to the pinching, the elliptical tapered rollers 204 are prohibited from rolling and exert an extreme force on the tool shaft 34 locking the tool shaft with the sleeve 206.

Figure 15:
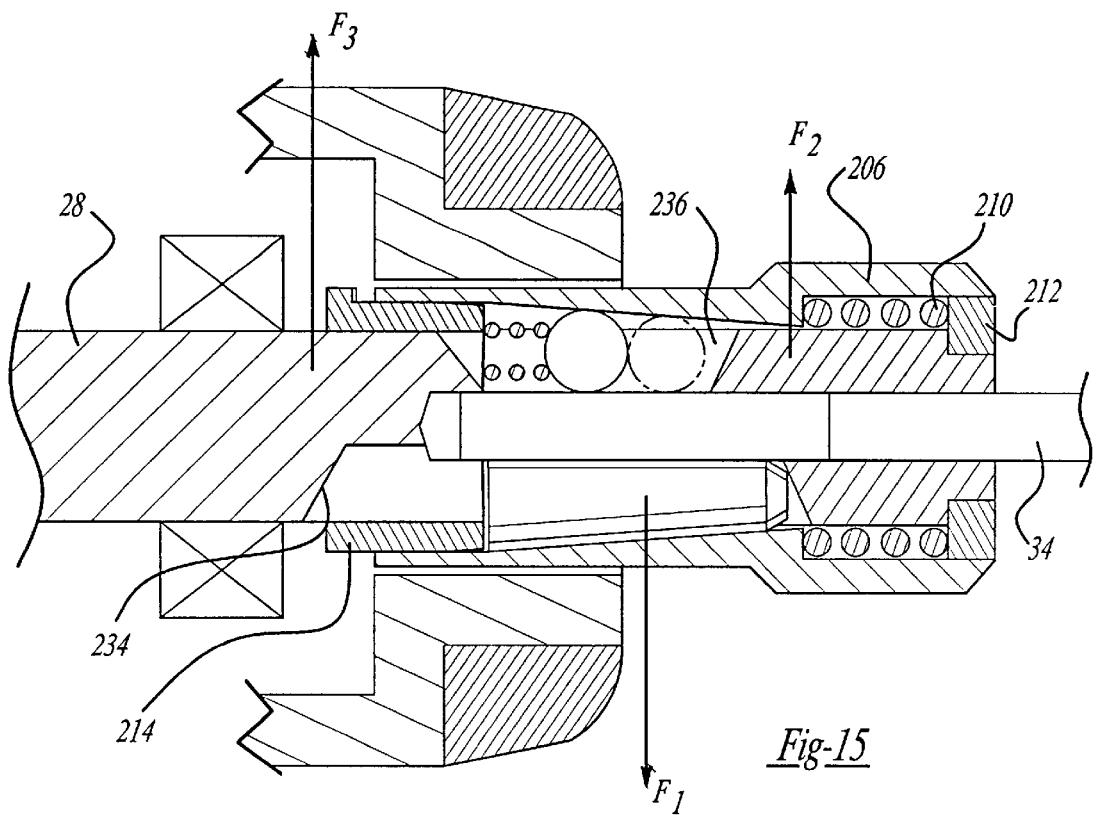
FIG. 15 is a view like FIG. 13 of another embodiment of the present invention.

Moving to FIG. 15, an additional embodiment is illustrated. Here, the quick release mechanism is like that illustrated in FIG. 13; however, the spindle apertures have different sizes. Thus, like elements will be identified with the same reference numerals.

The ball retention members 202 are retained in an aperture 232 which has an axial length which is less than the aperture 234 which retains the elliptical tapered rollers. Since the weight of the elliptical tapered rollers are substantially more than the one or two balls 202, a dynamic imbalance is created. In order to balance the rotational imbalance, the spindle 28 is modified to provide more mass by the balls 202, e.g. a smaller aperture, and less mass by the rollers 204, e.g. larger apertures. Thus, if force arrows F1, F2, F3 can be balanced with respect to one another, there is no rotational imbalance during operation of the tool.

Figure 16:
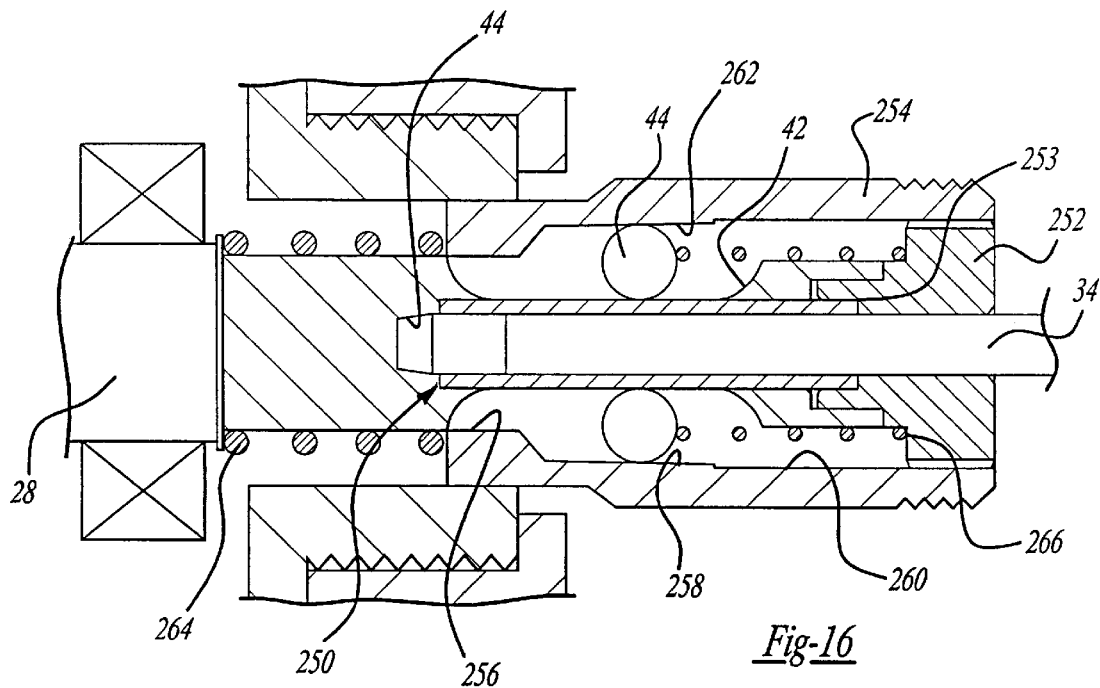
FIG. 16 is a cross-section view of another embodiment of the present invention.
Figure 17:
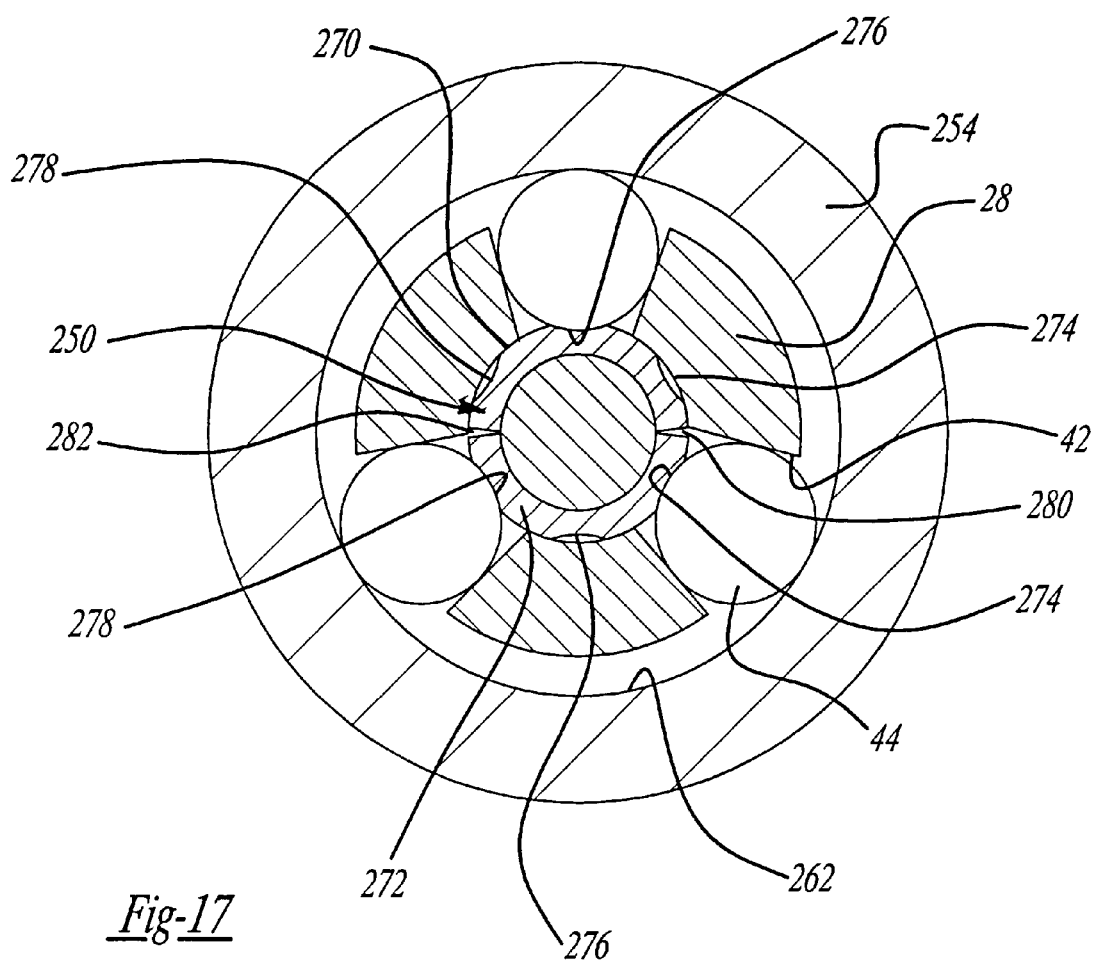
FIG. 17 is a cross-section view of FIG. 16 along line 17—17 thereof.

Turning to FIGS. 16 and 17, an additional embodiment of the present invention is shown. The spindle 28 is substantially the same as those previously described. However, the bore 46 has been modified to retain a split sleeve 250. The spindle includes apertures 42 to retain balls 44. The bore 46 includes a larger diameter portion to receive the split sleeve 250. The retention member 252 has been modified to include a stepped bore 253 to retain a portion of the split sleeve 250. The sleeve 254 includes three distinct bore portions 256, 258, 260. The bore portion 256 is sized to fit over the spindle 28. The bore portion 258 is tapered and is defined by a common tapered surface 262. The tapered surface 262 acts on the balls 44 like that previously defined. The bore portion 260 is substantially circular having a larger diameter than the tapered bore portion 258 to enable release of the tool when the balls enter into the bore portion 260. Springs 264 and 266 act like springs 54' and 52' previously described.

The sleeve 250 is like sleeve 100 previously described in that the sleeve prohibits the shaft from becoming marked or abraded by the balls acting on the shaft. Further, the sleeve 250 may be of a different hardness than that of the shaft. The sleeve 250 includes two substantially identical halves 270 and 272. The outer circumference of the halves 270 and 272 include three axially extending recesses or detents 274, 276, 278. The recesses 274, 276, 278 are positioned sixty (60°) degrees apart with respect to one another around a three hundred sixty (360°) degree circle. The recesses 274, 278 being thirty (30°) degrees from the ends 280, 282 of the halves 270, 272 with the middle recess being ninety (90°) degrees from the end 280, 282 as illustrated in FIG. 17.

Thus, the balls 44 act on the recesses at 274, 276, 278 ninety (90°) degrees, two hundred ten (210°) degrees and three hundred thirty (330°) degrees with respect to the circular shaft. The force being sufficient to retain the shaft within the split sleeve 250.

While the above detailed description describes the preferred embodiment of the present invention, the invention is susceptible to modification, variation, and alteration without deviating from the scope and fair meaning of the subjoined claims.

What is claimed is:

1. A releasable tool holder, comprising:

a spindle having two ends, one end adapted to secure said spindle with a rotary device and the other end including a bore to receive a tool;

a mechanism for retaining and releasing a tool from said spindle bore, said mechanism coupled with said spindle adjacent said bore end, said mechanism comprising at least two unlike retention members for applying a force on a tool in said bore for retaining a tool in said bore;

a sleeve surrounding a portion of said spindle and said at least two retention members, said sleeve including a common surface in contact with said at least two retention members, wherein said surface applying a force on said at least two retention members such that one retention member prohibits axial movement of the tool using a point contact and the other retention member prohibits circumferential movement of the tool using a line contact to maintain the tool in the bore, said sleeve movable to enable the tool to be removed from the bore, and a biasing member for maintaining said sleeve in a retention position on said spindle.

2. The releasable tool holder according to claim 1, wherein said spindle has at least two axial slots adjacent said bore for receiving said at least one retention member.

3. The releasable tool holder according to claim 2, wherein one of said slots is axially longer than the other for enhancing rotational balancing of said tool holder.

4. The releasable tool holder according to claim 1, wherein a tool receiving sleeve is positioned in said bore.

5. A rotary device, comprising:

a housing;

a motor in said housing for providing rotary movement;

a power source coupled with said motor;

a spindle coupled with said motor;

an activation member coupled with said motor for rotating said spindle; and a releasable tool holder coupled with said spindle, said spindle having two ends, one end secured to said motor and the other end including a bore to receive a tool;

a mechanism for retaining and releasing a tool from said spindle bore, said mechanism coupled with said spindle adjacent said bore end, said mechanism comprising at least two unlike retention members for applying a force on a tool in said bore for retaining a tool in said bore;

a sleeve surrounding a portion of said spindle and said at least two retention members, said sleeve including a common surface in contact with said at least two retention members, said surface applying a force on said at least two retention members such that one retention member prohibits axial movement of the tool using a point contact and the other retention member prohibits circumferential movement of the tool using a line contact to maintain the tool in the bore, said sleeve movable to enable the tool to be removed from the bore, and a biasing member for maintaining said sleeve in a retention position on said spindle.

6. The rotary device according to claim 5, wherein said spindle has at least two axial slots adjacent said bore for receiving said at least one retention member.

7. The rotary device according to claim 6, wherein one of said slots is axially longer than the other for enhancing rotational balancing of said tool holder.

* * * * *